US009970155B2

(12) United States Patent
Schoborg et al.

(10) Patent No.: US 9,970,155 B2
(45) Date of Patent: May 15, 2018

(54) ACID DYEING OF POLYURETHANE MATERIALS

(71) Applicant: NIKE, Inc., Beaverton, OR (US)

(72) Inventors: Anna Schoborg, Beaverton, OR (US); Reiko Matsuda-Dunn, Boulder, CO (US); Richard L. Watkins, Portland, OR (US); Yihua Chang, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days. days.

(21) Appl. No.: 13/786,056

(22) Filed: Mar. 5, 2013

(65) Prior Publication Data

US 2014/0250611 A1 Sep. 11, 2014

(51) Int. Cl.
*D06P 3/24* (2006.01)
*D06P 1/66* (2006.01)
*D06P 1/90* (2006.01)

(52) U.S. Cl.
CPC .......... *D06P 3/241* (2013.01); *D06P 1/66* (2013.01); *D06P 1/90* (2013.01)

(58) Field of Classification Search
CPC .... D06P 1/39; D06P 1/655; D06P 1/66; D06P 1/81; D06P 1/90; D06P 1/92; D06P 3/001; D06P 3/24; D06P 3/241; D06P 5/001
USPC ............ 8/463, 602, 606, 611, 620, 926, 929
See application file for complete search history.

(56) References Cited

U.S. PATENT DOCUMENTS

| | | | |
|---|---|---|---|
| 3,026,253 A * | 3/1962 | Woerner | 203/54 |
| 3,653,798 A * | 4/1972 | Boardman | 8/480 |
| 3,666,403 A * | 5/1972 | Shimachui | 8/489 |
| 3,994,872 A | 11/1976 | Kuster | |
| 4,717,390 A | 1/1988 | Dien | |
| 4,935,033 A | 6/1990 | Mosimann et al. | |
| 4,964,875 A | 10/1990 | Hendricks et al. | |
| 5,938,828 A * | 8/1999 | Zhao | C09B 67/0096 |
| | | | 106/272 |
| 5,948,152 A | 9/1999 | Zhao et al. | |
| 7,387,821 B2 | 6/2008 | Isogawa et al. | |
| 7,722,483 B2 | 5/2010 | Morgan et al. | |
| 8,308,587 B1 | 11/2012 | Morgan | |
| 2003/0106442 A1 | 6/2003 | Gosetii | |
| 2004/0066438 A1 | 4/2004 | Taguchi et al. | |
| 2004/0097302 A1 | 5/2004 | Isogawa et al. | |
| 2006/0055750 A1 * | 3/2006 | Taguchi | C09B 29/0037 |
| | | | 347/100 |
| 2006/0084757 A1 | 4/2006 | Isogawa et al. | |
| 2007/0207874 A1 | 9/2007 | Klein | |
| 2007/0256255 A1 | 11/2007 | Witman et al. | |
| 2010/0087275 A1 | 4/2010 | Isogawa et al. | |
| 2011/0173762 A1 | 7/2011 | Tutmark | |
| 2011/0206850 A1 | 8/2011 | Smith | |
| 2012/0122614 A1 | 5/2012 | Iizuka et al. | |
| 2012/0183691 A1 | 7/2012 | Kuntimaddi et al. | |
| 2014/0072442 A1 | 3/2014 | Bowman et al. | |

FOREIGN PATENT DOCUMENTS

| | | |
|---|---|---|
| EP | 2557224 A1 | 2/2013 |
| JP | 2004300588 A | 10/2004 |
| JP | 2006115946 A | 5/2006 |
| WO | 2011035533 A1 | 3/2011 |
| WO | WO 2011/035533 * | 3/2011 |

OTHER PUBLICATIONS

Mutherman G, et al.: "Selective extraction and separation of textile anionic dyes from aqueous solution by tetrabutyl ammonium bromide," Dyes and Pigments, Elsevier Applied Science Publishers. Barking, GB, vol. 64, No. 3, Mar. 1, 2005 (Mar. 1, 2005).
Written Opinion and International Search Report for PCT/IB2014/001387 dated Dec. 19, 2014.
International Search Report and Written Opinion dated May 15, 2014 for PCT/US2014/014572.
International Search Report and Written Opinion dated Aug. 4, 2014 for PCT/US2014/014566.
RIT, Dyed Golf Balls, http://www.ritdye.com/diy-projects/odds-ends/dyed-golf-balls.
International Preliminary Report on Patentability for PCT/US2014/014566 dated Mar. 9, 2015.

* cited by examiner

*Primary Examiner* — Amina S Khan
(74) *Attorney, Agent, or Firm* — Shook, Hardy & Bacon L.L.P.

(57) ABSTRACT

A polyurethane is dyed with an aqueous solution of an acid dye compound, a quaternary ammonium compound selected from soluble tetrabutylammonium compounds and tetrahexylammonium compounds, and, optionally, an water-soluble organic solvent.

18 Claims, No Drawings

ACID DYEING OF POLYURETHANE MATERIALS

FIELD OF THE INVENTION

The invention is related to methods of dyeing materials and to the dyed materials produced by those methods.

INTRODUCTION TO THE DISCLOSURE

This section provides background information related to this disclosure but which may or may not be prior art.

Zhao et al., U.S. Pat. Nos. 5,938,828 and 5,948,152 disclose complexes of anionic organic dyes with quaternary ammonium compounds, particularly with alkoxylated moieties. Unwanted salts formed from the cations of the dye and counter-ions are removed to obtain a dyeing agent that easily disperses within different media and possesses favorable non-migration and coloring characteristics. The examples disclosed include a complex of acid red with dicoco dimethyl ammonium chloride; a complex of direct blue with ditallow dimethyl ammonium chloride; and complexes of direct blue, acid red, acid yellow, and quinoline yellow with methyl bis[polyethoxy (15) ethanol] coco ammonium chloride.

Various patents disclosing novel anionic dyes, for example Benguerrel, U.S. Pat. No. 4,384,870; Uehlinger, U.S. Pat. No. 4,466,920; Schoefberger, U.S. Pat. No. 5,354,849; and Benguerrel, Swiss Patent CH 635 361 generally disclose anionic dyes with various counterions and mention polyurethane textiles as substrates that can be dyed with the anionic dyes.

Acid dyes are generally used to dye protein fibers such as wool and silk and to dye polyamide (nylon) fibers. Acid dyes are known to have less success dyeing other materials. For instance, Haerri et al., WO 2011/035533 describes dyeing textile blends of polyamide and elastane (also known as spandex and which has both urethane and urea linkages) fibers by adding a combination of a betaine, quaternary ammonium salt, and alkoxylated fatty alcohol as a shade enhancing agent to the dye liquor to diminish the shade difference between the polyamide and elastane fibers. B. H. Patel et al., "Dyeing of polyurethane fibre with acid dyes," The Indian Textile Journal (September 2009) notes shortcomings in colorfastness.

Clothing, accessories, or athletic wear are often a source of expression for the wearer. The clothing, accessories, or athletic wear may provide an association with a team, coordinate with another item, or provide the owner or user with an attractive or customized item. All or part of the clothing, accessories, or athletic wear may provide the team association and attractive features.

Athletic shoes can include inflated bladders, or airbags, for cushioning. Footwear incorporating permanently inflated airbags have been sold under the trademark "Air-Sole" and other trademarks by Nike, Inc. of Beaverton, Oreg. Such bladders may be nitrogen-filled or air-filled and may include multi-layer films like those disclosed in U.S. Pat. Nos. 6,013,340; 6,082,025; 6,127,026; 6,203,868; 6,391,405; 6,582,786; 6,599,597; 6,846,534; and 7,730,379, hereby incorporated herein by reference in their entirety, that may have polyurethane outer layers.

In addition to the cushioning features, airbags may also provide aesthetic features. In the past inflatable bladders or airbags were sometimes made from colored films. However, the use of colored films limits the design options and provides waste materials that may not have a designated use and thus present a problem for recycling.

Metal complex dyes have proven satisfactory for dyeing polyurethane substrates, see Bracken & Chang, U.S. Patent Application Publication No. 2008/0098536 published May 1, 2008, the contents of which are incorporated herein by reference, but metal complex dyes are more expensive and available in a limited palette of generally more subdued colors as compared to acid dyes.

SUMMARY OF THE DISCLOSURE

This section provides a general summary of the disclosure.

While in general acid dyes, also known as anionic dyes, do not dye polyurethane materials well under mild dyeing conditions, only lightly tinting the polyurethane materials, we discovered that addition of particular ammonium salts to the dye solution increases affinity of the acid dye molecules toward the polyurethane materials to provide intensely colored products with good colorfastness.

Accordingly, in one aspect of the invention, an aqueous dye solution includes an anionic dye compound, a quaternary ammonium salt selected from soluble tetrabutylammonium compounds and tetrahexylammonium compounds, and, optionally, a water-soluble organic solvent. The tetraalkylammonium compound may be, for example, a halide, hydroxide, sulfate, carboxylate, carbonate or other salt soluble in the aqueous dye solution. By "soluble" tetraalkylammonium compounds it is meant that the tetraalkylammonium compound is at least partially, preferably fully, soluble in aqueous dye solution at the temperature at which dyeing is carried out.

In another aspect of the invention, a process for dyeing polyurethane material includes contacting the polyurethane material with the aqueous dye solution, for example by immersing the polyurethane material in the aqueous dye solution or by applying the aqueous dye solution to the polyurethane material, for a time sufficient for the anionic dye compound to color the polyurethane material.

In various embodiments, the polyurethane material may be a fiber, yarn, thread, filament, hank, spool, sheet, woven or nonwoven fabric, felt, fleece, membrane, carpet, molded article, or other article having polyurethane or a blend including polyurethane as at least a portion of its surface, or an article including one of these. In certain embodiments a polyurethane airbag or bladder, such as for footwear, is dyed by the process. The process may be used to dye a print on the polyurethane article.

In another aspect of the invention, an article comprises a polyurethane material or part dyed by this process. Where the article is an assembly of parts including at least one part comprising a polyurethane, the part or parts comprising polyurethane may be dyed before or after being assembled to make the article.

In various embodiments, the article may be or include a polyurethane or polyurethane-containing sheet, fabric, or membrane, an airbag or bladder including a polyurethane layer or membrane, or a piece of synthetic leather having a polyurethane coating. In various embodiment, the article is an article of footwear incorporating such an airbag or bladder, polyurethane or polyurethane-containing sheet, fabric, or membrane, or synthetic leather having a polyurethane coating, in each case the polyurethane material having been dyed by the disclosed process either before or after the article of footwear is assembled.

The aqueous dye solutions and processes provide surprisingly deeper, richer colors and better colorfastness used with polyurethane materials.

The terms "acid dye" and "anionic dye" are used interchangeably throughout the description and claims.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used in this specification, the term "and/or" includes any and all combinations of one or more of the associated listed items.

Further areas of applicability will become apparent from the description provided herein. It should be understood that the description and specific examples are intended for purposes of illustration only and are not intended to limit the scope of the present disclosure.

DETAILED DESCRIPTION

This section provides specific examples that are not necessarily limiting as to materials, processes, or uses. The details, examples and preferences provided for particular aspects apply equally to all aspects of the invention.

A polyurethane material is dyed in an acid dye solution including an anionic dye compound, a quaternary ammonium salt selected from soluble tetrabutylammonium compounds and tetrahexylammonium compounds, and, optionally, a water-soluble organic solvent.

Acid dyes are water-soluble anionic dyes. Acid dyes are available in a wide variety, from dull tones to brilliant shades. Chemically, acid dyes include azo, anthraquinone and triarylmethane compounds.

The "Color Index" (C.I.), published jointly by the Society of Dyers and Colourists (UK) and by the American Association of Textile Chemists and Colorists (USA), is the most extensive compendium of dyes and pigments for large scale coloration purposes, including 12000 products under 2000 C.I. generic names. In the C.I. each compound is presented with two numbers referring to the coloristic and chemical classification. The "generic name" refers to the field of application and/or method of coloration, while the other number is the "constitution number." Nonlimiting examples of acid dyes include Acid Yellow 1, 17, 23, 25, 34, 42, 44, 49, 61, 79, 99, 110, 116, 127, 151, 158:1, 159, 166, 169, 194, 199, 204, 220, 232, 241, 246, and 250; Acid Red, 1, 14, 17, 18, 42, 57, 88, 97, 118, 119, 151, 183, 184, 186, 194, 195, 198, 211, 225, 226, 249, 251, 257, 260, 266, 278, 283, 315, 336, 337, 357, 359, 361, 362, 374, 405, 407, 414, 418, 419, and 447; Acid Violet 3, 5, 7, 17, 54, 90, and 92; Acid Brown 4, 14, 15, 45, 50, 58, 75, 97, 98, 147, 160:1, 161, 165, 191, 235, 239, 248, 282, 283, 289, 298, 322, 343, 349, 354, 355, 357, 365, 384, 392, 402, 414, 420, 422, 425, 432, and 434; Acid Orange 3, 7, 10, 19, 33, 56, 60, 61, 67, 74, 80, 86, 94, 139, 142, 144, 154, and 162; Acid Blue 1, 7, 9, 15, 92, 133, 158, 185, 193, 277, 277:1, 314, 324, 335, and 342; Acid Green 1, 12, 68:1, 73, 80, 104, 114, and 119; Acid Black 1, 26, 52, 58, 60, 64, 65, 71, 82, 84, 107, 164, 172, 187, 194, 207, 210, 234, 235, and combinations of these. The acid dyes may be used singly or in any combination in the dye solution.

Acid dyes are commercially available from many sources, including Dystar L.P., Charlotte, N.C. under the trademark TELON, Huntsman Corporation, Woodlands, Tex. under the trademarks ERIONYL and TECTILON, BASF SE, Ludwigshafen, Germany under the trademark BASACID, and Bezema AG, Montlingen, Switzerland under the trade name Bemacid.

The acid dye solution may include from about 0.001 to about 5.0 g/L, preferably from about 0.01 to about 2 g/L of the acid dye compound or combination of acid dye compounds. The amount of acid dye compound use will determine how strong the color is of the dyed polyurethane and how quickly the polyurethane is dyed, and may be optimized in a straightforward manner; generally, a more concentrated dye solution can provide a stronger (deeper, darker, more intense) dyed color and can be quickly dye the polyurethane.

The dye solution also includes a quaternary (tetraalkyl) ammonium salt selected from soluble tetrabutylammonium compounds and tetrahexylammonium compounds. The counterion of the quaternary ammonium salt should be selected so that the quaternary ammonium salt forms a stable solution with the anionic dye. The quaternary ammonium compound may be, for example, a halide (such as chloride, bromide or iodide), hydroxide, sulfate, sulfite, carbonate, perchlorate, chlorate, bromate, iodate, nitrate, nitrite, phosphate, phosphite, hexyluorophosphite, borate, tetrafluoroborate, cyanide, isocyanide, azide, thiosulfate, thiocyanate, or carboxylate (such as acetate or oxalate). In certain embodiments, an anion that is a weaker Lewis base may be selected for the tetraalkylammonium compound to produce a darker color in the dyed article. In various embodiments, the tetraalkylammonium compound is or includes a tetrabutylammonium halide or tetrahexylammonium halide, particularly a tetrabutylammonium bromide or chloride or a tetrahexylammonium bromide or chloride.

The acid dye solution may include from about 0.1 to about 5 equivalents of the soluble tetraalkylammonium compound per equivalent of dye compound. In various embodiments, the acid dye solution may include from about 0.5 to about 4, preferably from about 1 to about 4 equivalents of the tetraalkylammonium compound per equivalent of dye compound. The amount of tetraalkylammonium compound used with a particular acid dye compound depends upon the rate of diffusion of the dye into and in the polyurethane and may be optimized in a straightforward manner, for example as demonstrated by the working examples at the end of this specification.

The dye solution may include a water-soluble organic solvent. Water solubility of a particular organic solvent used in a particular amount in the dye solution is determined at 20° C. and 1 atm. pressure at the concentration at which the alcohol is to be used in the dye solution; the organic solvent is water soluble if it fully dissolves or is fully miscible in water at 20° C. and 1 atm. pressure at the concentration at which the alcohol is to be used in the dye solution and does not form any separate phase or layer. Suitable, nonlimiting water-soluble organic solvents that may be used include alcohols, such as methanol, ethanol, n-propanol, isopropanol, ethylene glycol, diethylene glycol, triethylene glycol, tetraethylene glycol, propylene glycol, propylene glycol monomethyl ether, dipropylene glycol, tripropylene glycols, and glycerol; ketones, such as acetone and methyl ethyl ketone; esters, such as butyl acetate, which is soluble in limited amounts in water; and glycol ethers and glycol ether esters (particularly acetates), such as ethylene glycol monobutyl ether, propylene glycol monomethyl ether, and propylene glycol monomethyl ether acetate. The water-soluble organic solvent may be included in concentrations of up to about 50% by volume, or up to about 25% by volume, or from about 1% to about 50% by volume, or from about 5% to about 40% by volume, or from about 10% to about 30% by volume, or from about 15% to about 25% by volume of the aqueous medium used to make the dye solution. Whether an organic solvent is used and how much organic solvent is used varies according to which dye is used and to the application method for contacting the dye solution with the polyurethane. For instance, no or minimal organic solvent may be included in a dye solution into which the polyurethane is dipped in dyeing the polyurethane, while substantially more organic solvent may be included when the dye is sprayed or printed onto the polyurethane.

The dye solutions now disclosed are stable and less expensive relative to metal complex dye solutions for dyeing polyurethane. The process of dyeing polyurethane articles with the disclosed dye solution produces strong color intensity. A wide selection of colors is available, including bright colors unavailable using metal complex dyes.

In various embodiments, the polyurethane material that is dyes may be a fiber, yarn, thread, filament, hank, spool, sheet, woven or nonwoven fabric, felt, fleece, membrane, carpet, molded article, or other article having polyurethane or a blend including polyurethane as at least a portion of its surface, or an article including one of these. In certain embodiments a polyurethane airbag or bladder, such as for footwear or for cushioning in another article, is dyed by the process. In certain embodiments, the polyurethane material is an inflated or uninflated bladder or is a sheet used to form an inflated bladder, such as may be used for cushioning in footwear or may be used in other inflated or cushioned devices such as balls or articles of furniture. Such, bladders include multi-layer films having polyurethane outer layer prepared as disclosed in any of U.S. Pat. Nos. 5,952,065; 5,713,141; 6,013,340; 6,082,025; 6,127,026; 6,203,868; 6,391,405; 6,582,786; 6,599,597; 6,846,534; and 7,730,379, all of which are hereby incorporated herein by reference in their entireties. The polyurethane material may also be a synthetic leather having a polyurethane coating or layer over a backing layer, e.g. a polyester backing layer, or a woven or nonwoven polyurethane fabric, such as any of those described in Dua et al., US 2010/0199520 and US 2010/0199406; U.S. patent application Ser. No. 13/045,168, entitled "Layered Thermoplastic Non-Woven Textile Elements"; Schumacher et al, U.S. Pat. No. 4,310,373; Yamakawa et al, US Patent Application Publication No. 2003/0119411; and Sunkara, US Patent Application Publication No. 2007/0129524, all of which are hereby incorporated herein by reference in their entireties. The synthetic leather or woven or nonwoven polyurethane fabric may be incorporated into an article of footwear, clothing, or furniture before or after being dyed.

In various embodiments, the article has an exterior thermoplastic polyurethane elastomer layer or portion. The thermoplastic polyurethane elastomer may be selected from thermoplastic polyester-polyurethanes, polyether-polyurethanes, and polycarbonate-polyurethanes, including, without limitation, polyurethanes polymerized using as diol reactants polytetrahydrofurans, polyesters, polycaprolactone polyesters, and polyethers of ethylene oxide, propylene oxide, and copolymers including ethylene oxide and propylene oxide. These polymeric diol-based polyurethanes are prepared by reaction of the polymeric diol (polyester diol, polyether diol, polycaprolactone diol, polytetrahydrofuran diol, or polycarbonate diol), one or more polyisocyanates, and, optionally, one or more chain extension compounds. Chain extension compounds, as the term is used herein, are compounds having two or more functional groups reactive with isocyanate groups. Preferably the polymeric diol-based polyurethane is substantially linear (i.e., substantially all of the reactants are di-functional).

The polyester diols used in forming the preferred thermoplastic polyurethane of the invention are in general prepared by the condensation polymerization of polyacid compounds and polyol compounds. Preferably, the polyacid compounds and polyol compounds are di-functional, i.e., diacid compounds and diols are used to prepare substantially linear polyester diols, although minor amounts of mono-functional, tri-functional, and higher functionality materials (perhaps up to 5 mole percent) can be included. Suitable dicarboxylic acids include, without limitation, glutaric acid, succinic acid, malonic acid, oxalic acid, phthalic acid, hexahydrophthalic acid, adipic acid, maleic acid and mixtures of these. Suitable polyols include, without limitation, wherein the extender is selected from the group consisting of ethylene glycol, diethylene glycol, triethylene glycol, tetraethylene glycol, propylene glycol, dipropylene glycol, tripropylene glycol, tetrapropylene glycol, cyclohexanedimethanol, 2-ethyl-1,6-hexanediol, Esterdiol 204 (sold by Eastman Chemical Co.), 1,4-butanediol, 1,5-pentanediol, 1,3-propanediol, butylene glycol, neopentyl glycol, and combinations thereof. Small amounts of triols or higher functionality polyols, such as trimethylolpropane or pentaerythritol, are sometimes included. In a preferred embodiment, the carboxylic acid includes adipic acid and the diol includes 1,4-butanediol; in a particularly preferred embodiment, the polyurethane has a polyester block prepared by polymerization of 1,4-butanediol and adipic acid. Typical catalysts for the esterification polymerization are protonic acids, Lewis acids, titanium alkoxides, and dialkyltin oxides.

The polymeric polyether or polycaprolactone diol reactant used in preparing the preferred thermoplastic polyurethanes reacting a diol initiator, e.g., ethylene or propylene glycol, with a lactone or alkylene oxide chain-extension reagent. Preferred chain-extension reagents are epsilon caprolactone, ethylene oxide, and propylene oxide. Lactones that can be ring opened by an active hydrogen are well-known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is ε-caprolactone. Useful catalysts include, those mentioned above for polyester synthesis. Alternatively, the reaction can be initiated by forming a sodium salt of the hydroxyl group on the molecules that will react with the lactone ring.

In other embodiments, a diol initiator may be reacted with an oxirane-containing compound to produce a polyether diol to be used in the polyurethane polymerization. The oxirane-containing compound is preferably an alkylene oxide or cyclic ether, especially preferably a compound selected from ethylene oxide, propylene oxide, butylene oxide, tetrahydrofuran, and combinations of these. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The alkylene oxide polymerization is typically base-catalyzed. The polymerization may be carried out, for example, by charging the hydroxyl-functional initiator and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition and polymerized in blocks by sequential addition. Homopolymers or copolymers of ethylene oxide or propylene oxide are preferred. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above.

Aliphatic polycarbonate diols are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

In certain embodiments, The polyester diol has linear alkylene groups having from two to about six carbon atoms between substantially all of the ester groups. By "substantially all" it is meant that not more than about 5 mole percent, preferably not more than about 2 mole percent, and most preferably none, of the alkylene groups between the ester groups have less than two or more than about six carbon atoms. The polyester can be prepared from diols of from two to six carbon atoms reacted with dicarboxylic acids having four to six carbon atoms and/or epsilon-caprolactone. Accordingly, the polyester diol may be prepared by reaction of one or more diols selected from ethylene glycol, 1,3-propanediol, 1,4-butanediol, 1,5-pentanediol, 1,6-hexanediol and combinations of these with one or more dicarboxylic acids selected from succinic acid, glutaric acid, adipic acid, anhydrides of these acids, and combinations thereof or with epsilon-caprolactone.

The polyester diol preferably has a weight average molecular weight of at least about 500, more preferably at least about 1000, and even more preferably at least about 1800. The polyester diol may have a weight average molecular weight of up to about 10,000, but polyester diols having weight average molecular weight of up to about 5000, especially up to about 4000, are preferred. The polyester diol advantageously has a weight average molecular weight in the range from about 500 to about 10,000, preferably from about 1000 to about 5000, and more preferably from about 1500 to about 4000. The weight average molecular weights may be determined by ASTM D-4274.

The synthesis of the elastomeric polyurethane may be carried out by reacting one or more of the above polymeric diols, one or more compounds having at least two isocyanate groups, and, optionally, one or more change extension agents. The elastomeric polyurethanes are preferably linear and thus the polyisocyanate component preferably is substantially di-functional. Useful diisocyanate compounds used to prepare the thermoplastic polyurethanes of the invention, include, without limitation, isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), the various isomers of toluene diisocyanate, meta-xylylenediioscyanate and para-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and combinations thereof. Particularly useful is diphenylmethane diisocyanate (MDI).

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders preferably range from about 60 to about 400. Alcohols and amines are preferred. Typical examples of useful diols that are used as polyurethane chain extenders include, without limitation, 1,6-hexanediol, cyclohexanedimethanol (sold as CHDM by Eastman Chemical Co.), 2-ethyl-1,6-hexanediol, Esterdiol 204 (sold by Eastman Chemical Co.), 1,4-butanediol, ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; 1,3-propanediol, 1,4-butanediol, neopentyl glycol, dihydroxyalkylated aromatic compounds such as the bis(2-hydroxyethyl)ethers of hydroquinone and resorcinol; p-xylene-α,α'-diol; the bis(2-hydroxyethyl)ether of p-xylene-α,α'-diol; m-xylene-α,α'-diol and the bis(2-hydroxyethyl)ether and mixtures thereof. Suitable diamine extenders include, without limitation, p-phenylenediamine, m-phenylenediamine, benzidine, 4,4'-methylenedianiline, 4,4'-methylenibis (2-chloroaniline), ethylene diamine, and combinations of these. Other typical chain extenders are amino alcohols such as ethanolamine, propanolamine, butanolamine, and combinations of these. Preferred extenders include ethylene glycol, diethylene glycol, triethylene glycol, tetraethylene glycol, propylene glycol, dipropylene glycol, tripropylene glycol, tetrapropylene glycol, 1,3-propylene glycol, 1,4-butanediol, 1,6-hexanediol, and combinations of these.

In addition to the above-described difunctional extenders, a small amount of trifunctional extenders such as trimethylol propane, 1,2,6-hexanetriol and glycerol, and/or monofunctional active hydrogen compounds such as butanol or dimethyl amine, may also be present. The amount of trifunctional extenders and/or monofunctional compounds employed would preferably be 5.0 equivalent percent or less based on the total weight of the reaction product and active hydrogen containing groups employed.

The polyurethane may be bio-based, for example as disclosed in U.S. Pat. No. 8,217,193, US Patent Application Publication No. 2008/0103340, US Patent Application Publication No. 2011/0155960, US Patent Application Publication No. 2010/0168371, US Patent Application Publication No. 2008/0081898, and PCT Publication WO08/022287, all of which are incorporated herein by reference in their entireties.

The reaction of the polyisocyanate, polymeric diol, and chain extension agent is typically conducted by heating the components, for example by melt reaction in a twin screw extruder. Typical catalysts for this reaction include organotin catalysts such as stannous octoate. Generally, the ratio of polymeric diol, such as polyester diol, to extender can be varied within a relatively wide range depending largely on the desired hardness of the final polyurethane elastomer. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 0.95:1 to 1.10:1, and more preferably, 0.98:1 to 1.04:1. The polymeric diol segments typically are from about 35% to about 65% by weight of the polyurethane polymer, and preferably from about 35% to about 50% by weight of the polyurethane polymer.

The polyurethane article or surface layer may include blends of polyurethane. For example, a polyurethane including soft segments of polyether diols or polyester diols formed from the reaction mixture of a carboxylic acid and a diol wherein the repeating units of the reaction product has more than eight carbon atoms can be blended with polyurethanes including polyester diols having repeating units of eight or fewer carbon atoms or products of branched diols. Preferably, the polyurethanes other than those including polyester diol repeating units having eight or less carbon atoms or with oxygen atoms connected to tertiary carbons will be present in the blends in an amount up to about 30 wt. %, (i.e. 70.0 wt. % polyethylene glycol adipate based polyurethane 30.0% isophthalate polyester diol based polyurethane). Specific examples of the polyester diols wherein the reaction product has more than eight carbon atoms include poly(ethylene glycol isophthalate), poly(1,4-butanediol isophthalate) and poly(1,6-hexanediol isophthalate). As an alternative to blends of various thermoplastic polyurethanes, a single polyurethane having various soft segments may be used. Again, without intending to be limiting, the soft segments may include, in addition to soft segments having a total of eight carbon atoms or less, polyether diols, polyester diols having a total of more than eight carbon atoms, or mixtures thereof. It is contemplated that the total amount of soft segment constituency which includes the reaction product of a carboxylic acid and a diol having a total carbon atom count of more than eight, be present in an amount of up to about 30 wt. % of the total weight of soft segments included in the polyurethane. Thus, at least 70 wt. % of the soft segment repeating units will be the reaction products of carboxylic acid and a diol, wherein the total carbon atom count for the reaction product is eight or fewer. It should also be noted that there are a number of ways to add polyurethanes with up to 30 wt. % of polyesters with repeat units containing more than eight carbon atoms to the polyurethanes of this invention. Thirty percent or less of a polyurethane derived from polyester diols containing repeat units with more than eight carbons can be blended as finished polymers with 70 wt. % or more of polyurethanes derived from polyester diols with repeat units containing eight or less carbon atoms, or a single polyurethane could be prepared from a mixture of polyester diols wherein 70 wt. % or more contain repeat units with eight carbons or less and the balance contains repeat units with more than eight carbons as described previously. A polyurethane could be prepared from a single diol prepared by reaction from dicarboxylic acids and diols such that 70 wt. % of the repeat units in the polyester diol contain eight or less carbon atoms. Combinations of these techniques are also possible. Among the acids that contain more than six carbon atoms that could be employed are isophthalic and phthalic acids.

The thermoplastic polyurethane elastomer articles include airbags for cushioning in shoes or straps (for example, shoulder straps for golf bags) and other polyurethane articles such as those mentioned in any of the documents mentioned above and incorporated by reference.

Turning to airbags, airbags are typically prepared with a laminate membrane. While the laminate membrane may be thin or thick, the laminate membrane should be thick enough to provide adequate wall strength and yet thin enough to provide adequate flexibility. Laminate membrane thicknesses from about 20 mils to about 70 mils are typical for blow molding operations. In the preferred five-layer structure (first layer-third layer-second layer-third layer-first layer), it is desirable for the barrier, second layer and the adjacent third, thermoplastic elastomer layer to each be at least about 0.4 mil thick, preferably at least about 0.5 mil thick, more preferably at least about 0.6 mil thick, and still more preferably at least about 1 mil thick; and for each of these layers to be up to about 3 mils thick, preferably up to about 2.5 mils thick, more preferably up to about 2 mils thick, and yet more preferably up to about 1.6 mils thick. The first, blend layers are preferably at least about 7 mils thick, more preferably at least about 8 mils thick, and still more preferably at least about 9 mils thick; and preferably up to about 20 mils thick, more preferably up to about 15 mils thick.

The laminate membrane may be formed into a bladder by a blow molding process. In general, the bladders may be formed by a first step of coextruding the layers, or plies, in a laminate film of flat or tubular shape, then blow molding the film or tube into a desired final shape. For example, melt materials of the layers may be co-extruded as a parison. A mold having the desired overall shape and configuration of the bladder is in position to receive the parison and is closed around the parison. The parison is cut at the edge of the mold. The mold is moved back to a position away from the extrusion die. The open portion of the parison above the mold is then fitted with a blow tube through which pressurized air or other gas, such as nitrogen, is provided. The pressurized air forces the parison against the inner surfaces of the mold. The material is hardened in the mold to form a bladder having the preferred shape and configuration. The blown, shaped laminate is allowed to cool and harden in the mold, which may be at about 30° F. to 80° F., before it is removed from the mold. Meanwhile, a new mold is moved into place to accept the next section from the parison that has been cut away from the first mold.

Besides blow molding using continuous extrusion, the forming step may use intermittent extrusion by reciprocating screw systems, ram accumulator-type systems, or accumulator head systems; co-injection stretch blow molding; extruded or co-extruded sheet, blown film tubing, or profiles. Other forming methods include injection molding, vacuum molding, transfer molding, pressure forming, heat-sealing, casting, melt casting, RF welding and so on.

The laminate may undergo further forming steps. For example, a flat laminate film may be cut into a desired shape. Two portions of the flat film may be sealed at the edges to form a bladder. The laminate film may alternatively be rolled into a tube and RF welded at the edges to form a bladder. The bladder may be inflated with a fluid, preferably a gas, and permanently sealed. The durable, elastomeric membranes of the inflated bladders are incorporated into the sole of an article of footwear. By "durable" it is meant that the membrane has excellent resistance to fatigue failure, which means that the membrane can undergo repeated flexing and/or deformation and recover without delamination along the layer interfaces of composite barrier membranes, preferably over a broad range of temperatures.

In certain embodiments, a layered non-woven polyurethane textile may be formed from a first layer and a second layer. The first layer is formed from a plurality of first filaments that include a first thermoplastic polyurethane with a first melting temperature. The second layer is located adjacent to the first layer and secured to the first layer. The second layer is formed from plurality of second filaments that include a second thermoplastic polyurethane with a second melting temperature. The first melting temperature is lower than the second melting temperature. The layered non-woven textile may have a fused region where the filaments are fused to a greater degree than in another region. Although the first filaments of the first layer may be fused to form a non-filamentous or partially filamentous configuration, the second filaments of the second layer may be substantially filamentous due to the differences in melting temperature. Moreover, strands or components may be incorporated into the layered non-woven textile. In some configurations, the strands or components may be heat-bonded with first thermoplastic polymer material of the first layer to join these elements to the layered non-woven textile. An individual filament may have a sheath-core configuration, with an exterior sheath of the thermoplastic polyurethane and an interior core of another type of thermoplastic polymer (which could also be a polyurethane or could be another type of thermoplastic polymer besides polyurethane). The thermoplastic polyurethane (and optional core polymer) may be elastomeric to make a stretchable fabric, such as one that may stretch at least one-hundred percent prior to tensile failure. The fabric may be made by collecting, laying, or otherwise depositing filaments upon a surface, such as a moving conveyor, (c) joining the filaments, and (d) imparting a desired thickness through compressing or other processes. Because the filaments may be relatively soft or partially melted when deposited upon the surface, the polymer materials from the filaments that contact each other may become bonded or fused together upon cooling. The layer of fabric may then be embossing or calendaring processes may be utilized to ensure that a non-woven textile formed from the filaments has a substantially constant thickness, impart texture to one or both of surfaces of the textile, or further bond or fuse the filaments to each other. Furthermore, hydrojet, hydroentangelment, needlepunching, or stitchbonding processes may also be utilized to modify properties of the non-woven textile. The non-woven textile may be formed as a spunbonded or meltblown material to include various fused regions that are portions of the non-woven textile that have been subjected to heat in order to selectively change the properties of those fused regions, as disclosed in the above-incorporated Dua et al., US 2010/0199520 and US 2010/0199406 and U.S. patent application Ser. No. 13/045,168, entitled "Layered Thermoplastic Non-Woven Textile Elements."

These and other polyurethane materials may be dyed by a process that includes contacting the polyurethane material with the aqueous dye solution, for example by immersing the polyurethane material in the aqueous dye solution or by applying the aqueous dye solution to the polyurethane material, for a time sufficient for the anionic dye compound to color the polyurethane material. The aqueous dye solution may be applied to the polyurethane material via a spray printing process. It is generally observed that, all other things being equal, a polyurethane with lower hardness takes a dye more readily than a polyurethane with higher hardness.

Elevated temperature may aid dyeing by solubilizing the dye and increasing dye diffusion into the polyurethane material. It is generally desirable to keep the temperature such that the article being dyed would not deform, however. In certain embodiments, the polyurethane material is dyed in a dye solution at a temperature of up to about 80° C., or preferably from about 20° C. to about 60° C., or more preferably from about 30° to about 60° C., depending on the softening point of the polyurethane in the polyurethane material or the deformation temperature of the polyurethane material or article.

The acid dye solution is kept in contact with the polyurethane material for a period of time sufficient to dye the polyurethane material to a desired degree of coloration.

Footwear, and in particular shoes, usually include two major components, a shoe upper and a sole. The general purpose of the shoe upper is to enclose the foot. For example, the shoe upper may be made from an attractive, highly durable, comfortable material or combination of materials, such as a polyurethane synthetic leather or polyurethane fiber-containing woven or nonwoven cloth that are dyed by the disclosed process using the acid dye solution including a quaternary ammonium salt selected from soluble tetrabutylammonium compounds and tetrahexylammonium compounds.

Colored substrates produced with the dyeing system of the present invention have good colorfastness reducing problems with color migration and have an improved visual appearance over color substrates produced from painting. Moreover, substrates such as inflated bladders colored with the instant dyeing system have better transparency than those prepared with colored sheets that use pigments as colorants.

The invention is further described in the following examples. The example is merely illustrative and does not in any way limit the scope of the invention as described and claimed. All parts are parts by weight unless otherwise noted.

EXAMPLES

A 75-mil (1.875-mm) thick sheet having thermoplastic polyurethane elastomer (TPU) outer layers was prepared by extrusion. The TPU used was the reaction product of a polyester of adipic acid and butanediol, MDI, and butanediol. The sheet was cut into 1"×2" (2.54 cm×5.08 cm) test pieces. The TPU test pieces were washed for 5 minutes in a mixture of 60% by volume of n-propanol (obtained from Ashland Chemical, Covington, Ky. and 40% by volume deionized water, then dried.

General procedures for preparing dye solutions for testing and dyeing samples are as follow. A pre-determined amount of dye was added to deionized water and alcohol mixture. The dye was dissolved by heating the solution to 40° C. with agitation, unless otherwise stated. Upon dissolution, an ammonium salt was added either as a solid or in the form of a concentrated aqueous solution. After the temperature of the dye solution reached 40° C., the pre-washed TPU test piece was placed in the dye bath for 10 minutes. The dyed TPU test piece was removed, rinsed with tap water, and dried by air for at least 24 hours before being tested for colorfastness (color migration).

Colorfastness (color migration) was tested using the following procedure. A dyed TPU test piece was sandwiched between 1"×2" (2.54 cm×5.08 cm) white pieces of different kinds of material to evaluate whether and how much the dye of the TPU test piece would migrate to the adjacent different kind of material. The white pieces were made of the same TPU sheet material as the test pieces, synthetic leather, leather, polyurethane foam, ethylene-vinyl alcohol copolymer (EVA) foam, a nonwoven thermoplastic polyurethane material (Aeroply® material), nylon mesh, polyethylene terephthalate (PET) fabric, multi-fiber stripe, PEBAX 5533, and PEBAX 7033 (obtained from Arkema, Inc., King of Prussia, Pa.). The sandwiched test pieces were then placed on a plate (two sandwiches per plate) of a colorfastness press (AATCC perspiration test press). After all test sandwiches were loaded, a weight was placed on top of the uppermost plate to ensure good contact between the dyed TPU test piece and the white pieces. The top plate was locked in position by tightening two side screws. The filled press was then placed in an oven at 70° C. for 5 days, at the end of which the press was removed from the oven and cooled. The white pieces were examined for color migration from the dyed TPU test pieces.

Example 1 and Comparative Examples A and B

A dye solution was prepared by dissolving 0.6 g of Telon Blue BB (Dystar) in 200 ml of 40% by volume of n-propanol and 60% by volume deionized water to provide a dye concentration of 3 g/L. Ammonium salt was added as shown in Table 1 for each example. The dyeing was carried out as in the General Procedure above. Results are shown in Table 1.

TABLE 1

| | Comparative Example A | Comparative Example B | Example 1 |
|---|---|---|---|
| Ammonium salt | None | Tetraethylammonium bromide ($9.5 \times 10^{-3}$M) | Tetrabutylammonium bromide ($9.5 \times 10^{-3}$M) |
| Color intensity | Barely tinted, only the edges show some blue | Very light | Moderate |

Example 2 and Comparative Examples C and D

A dye solution was prepared by dissolving 0.6 g of Telon Blue M-GLW (Dystar) in 200 ml of 20% by volume of n-propanol and 80% by volume deionized water. Ammonium salt was added as shown in Table 1 for each example. The dyeing was carried out as in the General Procedure above. Results are shown in Table 2.

TABLE 2

| | Comparative Example C | Example 2 | Comparative Example D |
|---|---|---|---|
| Ammonium salt | None | Tetrabutylammonium bromide ($1.2 \times 10^{-2}$M) | Cetyltrimethylammonium bromide ($1.1 \times 10^{-2}$M) |
| Color intensity | Barely tinted | Moderate | Light |

Examples 3-6 and Comparative Examples E, F

Two Erionyl dyes (Huntsman) were tested with three ammonium salts in 20% by volume of n-propanol and 80% by volume deionized water. The dye concentrations were kept at 1 g/L. The dyeing was carried out as in the General Procedure above. Results are shown in Table 3.

TABLE 3

| Erionyl Blue A-R | | | |
|---|---|---|---|
| | Comparative Example E | Example 3 | Example 4 |
| Ammonium salt | Tetraethylammonium bromide ($3.1 \times 10^{-3}$M) | Tetrabutylammonium bromide ($3.1 \times 10^{-3}$M) | Tetrahexylammonium bromide ($3.1 \times 10^{-3}$M) |
| Color intensity | Light | Dark | Moderate |
| Erionyl Bordeaux A-5B | | | |
| | Comparative Example F | Example 5 | Example 6 |
| Ammonium salt | Tetraethylammonium bromide ($3.1 \times 10^{-3}$M) | Tetrabutylammonium bromide ($3.1 \times 10^{-3}$M) | Tetrahexylammonium bromide ($3.1 \times 10^{-3}$M) |
| Color intensity | Light | Dark (massive dye precipitation) | Moderate (massive dye precipitation) |

Examples 7-9 show that some alcohol generally aids in dyeing the polyurethane material. Optimum alcohol level, however, varies according to the particular dye. An aqueous medium of about 15% by volume n-propanol and about 85% deionized water provided a good balance between solubility and color intensity of the dyed polyurethane material for the dyes that were tested.

Example 7

Telon Blue M-GLW (Dystar) and tetrabutylammonium bromide were dissolved in 200 ml of aqueous solution with varied n-propanol concentrations to give the concentrations shown in Table 4. The dyeing was carried out as in the General Procedure above. Results are shown in Table 4.

TABLE 4

| Dye concentration (g/L) | Tetrabutylammonium bromide concentration (g/L) | N-Propanol concentration (% by volume) | | | |
|---|---|---|---|---|---|
| | | 0 | 5 | 10 | 20 |
| 3 | 4 | Moderate | Very dark | Dark | Very light |
| 3 | 8 | Dark | Very dark | Very dark | Light |

TABLE 4-continued

| Dye concentration (g/L) | Tetrabutyl-ammonium bromide concentration (g/L) | N-Propanol concentration (% by volume) | | | |
|---|---|---|---|---|---|
| | | 0 | 5 | 10 | 20 |
| 6 | 16 | Dark | Very dark | Very dark | Moderate |

The color intensity of the dyed TPU sample as a function of n-propanol concentration follows the same trend regardless of the dye and tetrabutylammonium bromide concentrations.

Example 8

The general procedures for preparing dye solutions for testing was used, except that the proportion of n-propanol was varied at 0%, 5%, 10%, 15%, and 20% by volume, the balance being deionized water. Dye solutions were prepared using either Erionyl Blue A-R or Erionyl Bordeaux A-5B, in each case using tetrabutylammonium chloride as the ammonium salt. The dye solutions were prepared so that the dye and ammonium salt concentrations were each 1 g/L.

The dyeing was carried out as in the General Procedure above. The dyes behaved differently. The blue dye solution dyed TPU test piece darker with increasing n-propanol concentration, while the color intensity of the TPU test piece dyed with the Bordeaux red dye solution was darker with increasing n-propanol concentration up to a maximum darkness at about 10% and 15% by volume n-propanol, then the darkness drops sharply at 20% by volume n-propanol.

Some of the Bordeaux red dye precipitated from solution when the n-propanol concentration was 15% by volume or less. A small amount of the blue dye precipitated in the 0% n-propanol and 5% by volume n-propanol dye solutions.

Example 9

The color intensities of five Erionyl dyes (Huntsman) in aqueous 15 and 20% by volume n-propanol solutions were compared, as shown in Table 5. All of the dye solutions contained 1 g/L of the dye and 1 g/L of tetrabutylammonium chloride. The general procedures for preparing dye solutions for testing was used. No dye precipitation was observed.

TABLE 5

| | 15% by volume n-propanol | 20% by volume n-propanol |
|---|---|---|
| Erionyl Red A-3BN | Moderate | Light |
| Erionyl Yellow A-R | Dark | Very dark |
| Erionyl Red B-B | Dark | Moderate |
| Erionyl Yellow A-3G | Dark | Dark |
| Erionyl Red B-10B | Very dark | Dark |

Example 10

The general procedure for preparing dye solutions for testing was used to dye the TPU test pieces in an acid dye solution of Telon Blue M-GLW made with 5% by volume n-propanol and tetrabutylammonium bromide. The dye concentration was varied from 0.5 to 3 g/L, while the concentration of tetrabutylammonium bromide was kept at 4 g/L. No dye precipitation was observed. The color of the dyed TPU test pieces showed little variation, as indicated in Table 6.

TABLE 6

| | Dye conc. (g/L) | | | |
|---|---|---|---|---|
| | 0.5 | 1 | 2 | 3 |
| Color intensity | Moderate | Moderate | Moderate | Moderate |

Example 11

TPU test pieces were dyed in aqueous 5% by volume n-propanol solutions using Telon Blue M-GLW at 3 g/L and varying tetrabutylammonium bromide concentration at 1, 2, 3, and 4 g/L using the general procedures for preparing dye solution and testing. The color of the dyed TPU test pieces darkened at the tetrabutylammonium bromide concentration increased, but not in a linear fashion, the color intensity increased sharply going from 1 g/L to 2 g/L of the tetrabutylammonium bromide, but exhibited a more gradual increase going from 2 g/L to 3 g/L and from 3 g/L to 4 g/L of the tetrabutylammonium bromide.

Example 12

TPU test pieces were dyed in aqueous 20% by volume n-propanol solutions using Telon Blue M-GLW at 3 g/L and varying tetrabutylammonium bromide concentration at 4 and 8 g/L using the general procedures for preparing dye solution and testing. The color of the dyed TPU test pieces was darker at the higher tetrabutylammonium bromide concentration.

Example 13

TPU test pieces were dyed with three Telon dyes using the general procedures for preparing dye solution with concentrations as shown in Table 7 and testing, but at 40° C. and 60° C. The color intensity is recorded in Table 7 for each dye solution and temperature. The results show that higher temperature enhances color intensity obtained.

TABLE 7

| | Dye conc. (g/L) | Tetrabutyl-ammonium bromide conc. (g/L) | n-Propanol (% by volume) | 40° C. | 60° C. |
|---|---|---|---|---|---|
| Telon Blue M-GLW | 3 | 6 | 20 | Moderate | Dark |
| Telon Rhodamine M-BN | 3 | 6 | 20 | Moderate | Dark |
| Telon Flavine M-7G | 3 | 6 | 15 | Moderate | Dark |

Colorfastness.

The following dyes were tested for colorfastness: Tectilon Orange 3G-A, Tectilon Red F-2G, Lanaset Green B, Erionyl Red 2B, Erionyl Blue A-R, Erionyl Bordeaux A-5B, Erionyl Yellow A-R, Lanaset Blue 5G, Lanaset Red PA, Erionyl Red BB, Erionyl Red B-10B, Tectilon Blue 4R, Tectilon Yellow 2G, Erionyl Na A-R, Erionyl Red A-3G, Erionyl Yellow A-3G, Tectilon Blue 6G, Tectilon Red 2B, Tectilon Yellow 3R, Erionyl Red A-3BN, Erionyl Red B-RLS, Erionyl Violet B, Telon Blue BB, Telon Blue BRL, Telon Blue M-GLW, Telon Rhodamine M-BN, and Telon Flavine M-7G. Aqueous dye solutions were prepared using 1 g/L dye and 0.5 g/L tetrabutylammonium chloride with 15% by volume n-propanol according to the general procedures for preparing dye solution, except for Erionyl Red A-3BN, which was prepared using 3 g/L dye and 1 g/L tetrabutylammonium chloride to yield color dark enough to test. The polyurethane test pieces were dyed at 40° C. for 10 minutes in the dye solution for all Tectilon, Lanaset, and Erionyl dyes. Dyeing conditions for the Telon dyes varied as needed to produce a desired shade.

The dyed TPU test pieces were tested according to the colorfastness (color migration) test procedure. All dyes showed color migration to the same TPU sheet material as the test pieces, synthetic leather, polyurethane foam, and Aeroply, all of which either are polyurethane-based or have polyurethane top layer. Most dyes showed some bleed to PEBAX 5533 and some to the harder PEBAX 7033. the level of color bleed varied, but the bleed was limited to the surface and did not penetrate into the colorfastness testing materials. None of the dyes tested showed color migration to the multi-fiber stripe, nylon mesh, or polyethylene terephthalate (PET) fabric, and only a few showed slight color migration to leather and ethylene-vinyl alcohol copolymer (EVA) foam. All dyes were deemed to have passed the colorfastness test.

The foregoing description of the embodiments has been provided for purposes of illustration and description. It is not intended to be exhaustive or to limit the invention. Individual elements or features of a particular embodiment are generally not limited to that particular embodiment, but can be used in other embodiments and can be combined in other ways, even if not specifically shown or described. Such variations are included in the invention.

What is claimed is:

1. An aqueous dye solution for dyeing an article comprising a polyurethane material, the aqueous dye solution comprising:
   from about 0.5 to about 5.0 g/L of an acid dye compound;
   0.5 to 4 equivalents, per equivalent of the acid dye compound, of a soluble quaternary ammonium compound, the soluble quaternary ammonium compound selected from the group consisting of: tetrabutylammonium bromide, tetrabutylammonium chloride, tetrahexylammonium bromide, and tetrahexylammonium chloride; and
   from about 5% to about 15% by volume of a water-soluble organic solvent comprising a member selected from the group consisting of n-propanol and isopropanol.

2. An aqueous dye solution according to claim 1, wherein the soluble quaternary ammonium compound is selected from the group consisting of tetrahexylammonium bromide and tetrahexylammonium chloride.

3. An aqueous dye solution according to claim 1, wherein the water-soluble organic solvent comprises n-propanol.

4. An aqueous dye solution according to claim 1, consisting of water, from about 0.5 to about 5.0 g/L of the acid dye compound, 0.5 to 4 equivalents, per equivalent of the acid dye compound, of the soluble quaternary ammonium compound and from about 5% to about 15% by volume of the water-soluble organic solvent.

5. A method of dyeing an article comprising a thermoplastic polyurethane material, comprising:
   immersing the thermoplastic polyurethane material in an aqueous dye solution at a temperature of about 30° C. to about 60° C. for a time sufficient for the aqueous dye solution to color the thermoplastic polyurethane material,
   wherein the thermoplastic polyurethane material is a reaction product of one or more polyester diols, one or more compounds having at least two isocyanate groups, and optionally one or more chain extension compounds, wherein each of the one or more polyester diols has a weight average molecular weight of at least about 500, and wherein the one or more compounds having at least two isocyanate groups is selected from the group consisting of: isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate, meta-xylylenediioscyanate, para-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), diphenylmethane diisocyanate (MDI), and combinations thereof, and
   wherein the aqueous dye solution comprises:
   from about 0.001 to about 5.0 g/L of an acid dye compound;
   0.5 to 4 equivalents, per equivalent of the acid dye compound, of a soluble quaternary ammonium compound, the soluble quaternary ammonium compound selected from tetrabutylammonium compounds and tetrahexylammonium compounds; and
   optionally, from about 1% to about 50% by volume of a water-soluble organic solvent comprising a member selected from the group consisting of esters, ketones, glycol ether esters, and alcohols selected from the group consisting of methanol, ethanol, n-propanol, isopropanol, ethylene glycol, diethylene glycol, triethylene glycol, tetraethylene glycol, propylene glycol, propylene glycol monomethyl ether, dipropylene glycol, tripropylene glycol, glycerol, and glycol ethers; and
   removing the thermoplastic polyurethane material from the aqueous dye solution.

6. A method according to claim 5, wherein the thermoplastic polyurethane material comprises a member selected from the group consisting of thermoplastic polyurethane and thermoplastic polyurethane-containing fibers, yarns, threads, filaments, hanks, spools, sheets, woven and nonwoven fabrics, felts, fleeces, membranes, carpets, molded articles, articles of footwear, straps, synthetic leathers, and bladders and articles having thermoplastic polyurethane or a blend including thermoplastic polyurethane as at least a portion of a surface.

7. A method according to claim 5, wherein the thermoplastic polyurethane material comprises a polyester-polyurethane or polyether-polyurethane.

8. A method according to claim 5, wherein the aqueous dye solution further comprises the water-soluble organic solvent and the water-soluble organic solvent comprises a member selected from the group consisting of esters, glycol ether esters, and alcohols selected from the group consisting of methanol, ethanol, n-propanol, isopropanol, ethylene glycol, diethylene glycol, triethylene glycol, tetraethylene glycol, propylene glycol, propylene glycol monomethyl ether, dipropylene glycol, tripropylene glycol, glycerol, and glycol ethers.

9. A method according to claim 5, wherein the aqueous dye solution consists of:
water;
from about 0.001 to about 5.0 g/L of the acid dye compound;
0.5 to 4 equivalents, per equivalent of the acid dye compound, of the soluble quaternary ammonium compound, the soluble quaternary ammonium compound selected from tetrabutylammonium compounds and tetrahexylammonium compounds; and
from about 1% to about 50% by volume of the water-soluble organic solvent comprising a member selected from the group consisting of esters, glycol ether esters, and alcohols selected from the group consisting of methanol, ethanol, n-propanol, isopropanol, ethylene glycol, diethylene glycol, triethylene glycol, tetraethylene glycol, propylene glycol, propylene glycol monomethyl ether, dipropylene glycol, tripropylene glycol, glycerol, and glycol ethers.

10. A method according to claim 5, wherein the one or more polyester diols comprises a polyester of adipic acid and butanediol.

11. A method according to claim 10, wherein the thermoplastic polyurethane article is a reaction product of the polyester of adipic acid and butanediol, diphenylmethane diisocyanate (MDI), and butanediol.

12. A method according to claim 6, wherein the thermoplastic polyurethane material comprises the bladder, wherein the bladder comprises a multi-layer laminate membrane having a thermoplastic polyurethane outer layer that is at least 0.4 mils thick.

13. A method according to claim 6, wherein the thermoplastic polyurethane material comprises the nonwoven fabric.

14. A method according to claim 5, wherein the soluble quaternary ammonium compound is selected from the group consisting of: tetrahexylammonium bromide and tetrahexylammonium chloride.

15. A method according to claim 5, wherein the immersing comprises immersing the thermoplastic polyurethane material in the aqueous dye solution for ten minutes.

16. An article dyed by the method of claim 5.

17. A sheet, fabric, synthetic leather, or airbag according to claim 16.

18. An article of footwear or strap comprising a sheet, fabric, synthetic leather, or airbag according to claim 17.

* * * * *